C. H. AYARS.
MEASURING AND FILLING MACHINE.
APPLICATION FILED DEC. 8, 1915.

1,232,172.

Patented July 3, 1917.
3 SHEETS—SHEET 1.

Inventor
Charles H. Ayars
By
Mann & Co.
Attorneys

C. H. AYARS.
MEASURING AND FILLING MACHINE.
APPLICATION FILED DEC. 8, 1915.
1,232,172.
Patented July 3, 1917.
3 SHEETS—SHEET 2.
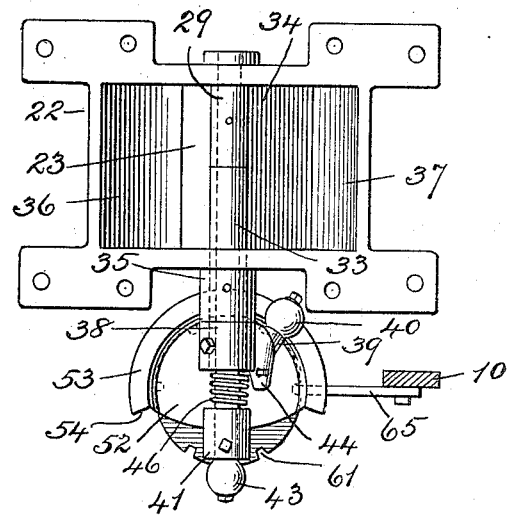
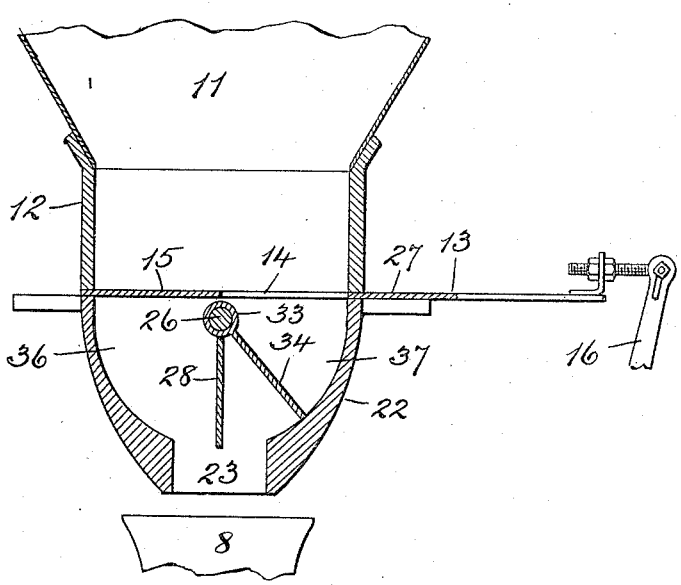
Inventor
Charles H. Ayars
By Mann & Co,
Attorneys.

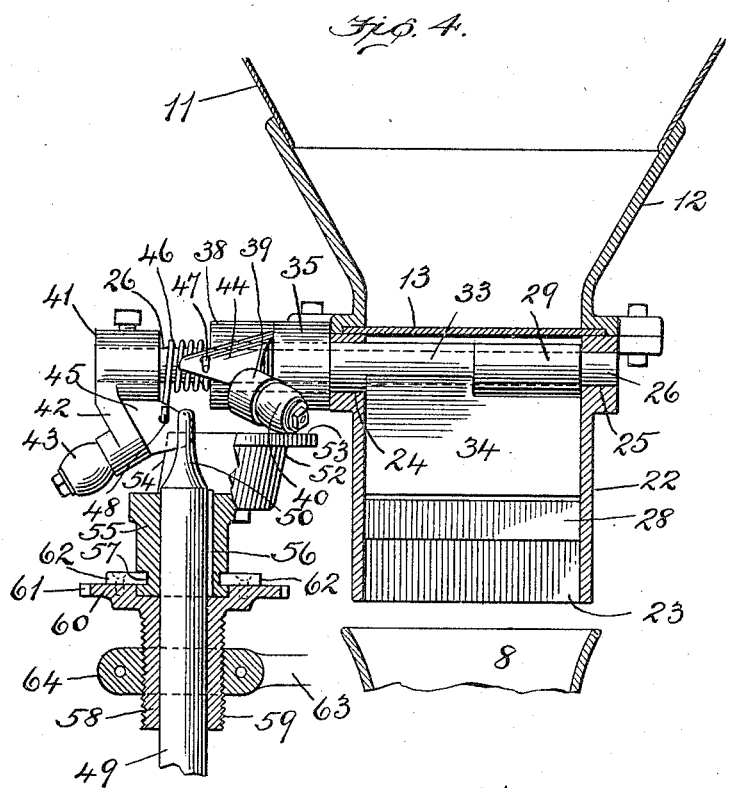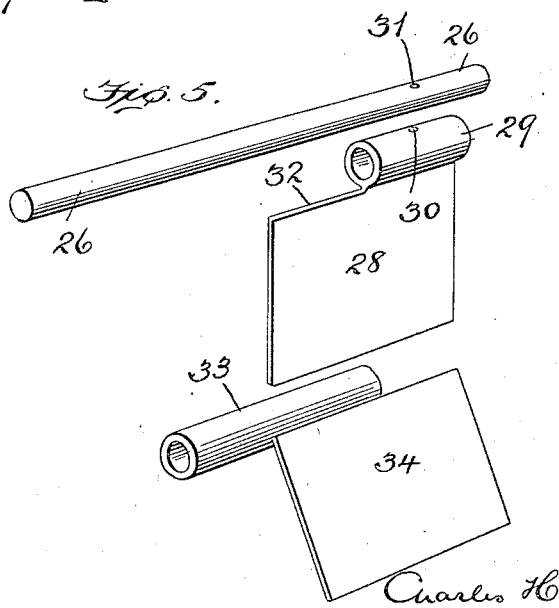

UNITED STATES PATENT OFFICE.

CHARLES H. AYARS, OF SALEM, NEW JERSEY, ASSIGNOR TO AYARS MACHINE CO., OF SALEM, NEW JERSEY, A CORPORATION OF NEW JERSEY.

MEASURING AND FILLING MACHINE.

1,232,172.      Specification of Letters Patent.      Patented July 3, 1917.

Application filed December 8, 1915. Serial No. 65,731.

*To all whom it may concern:*

Be it known that I, CHARLES H. AYARS, a citizen of the United States, residing at Salem, in the county of Salem and State of New Jersey, have invented certain new and useful Improvements in Measuring and Filling Machines, of which the following is a specification.

This invention relates to improvements in measuring and filling machines and more particularly has reference to machines for filling cans with peas, beans, berries and the like, although it may also be utilized for filling of receptacles other than cans.

Some of the objects of the invention are to provide improved means for measuring the quantity of material to be placed in each can or receptacle; to improve the means for varying the quantity to be discharged; to provide an improved measuring device that will enable one charge to be measured while another is being discharged and thereby enable the measuring operation to be conducted rapidly and to arrange the measuring devices with respect to the other means for depositing the measured material into the receptacles in such a way as to enable the filling operation to be carried on expeditiously and preferably while the receptacles are in motion.

The invention is illustrated in the accompanying drawings wherein,—

Fig. 2, illustrates in top plan, the improved measuring devices.

Fig. 3, shows a vertical cross sectional detail through the measuring devices.

Fig. 4, illustrates another vertical cross-sectional detail through the measuring devices,—the section being taken on a line at right angles to that on which the section in Fig. 3 is taken, and Fig. 5, illustrates in perspective the several valves and operating rod,—the parts being separated.

Figure 1:
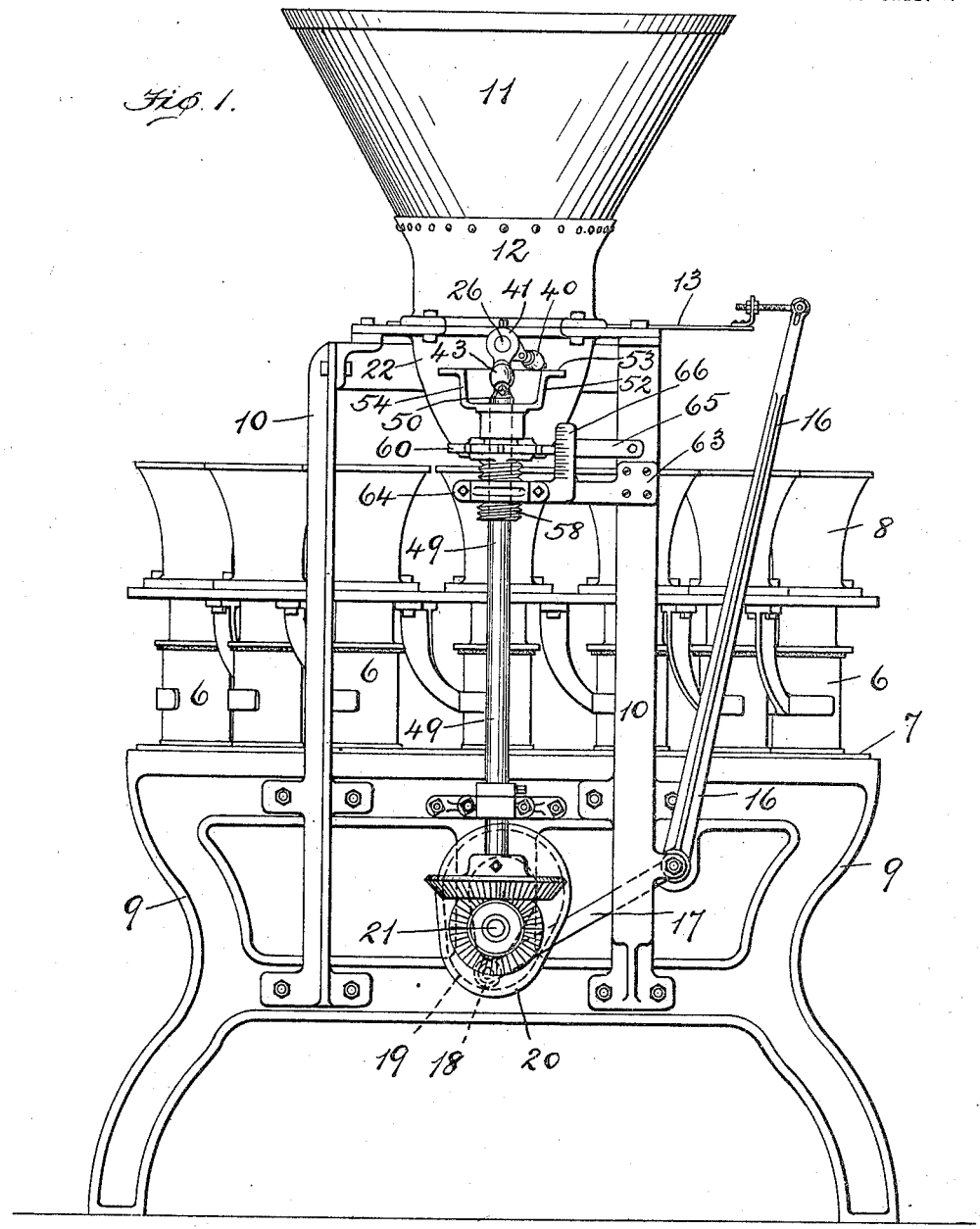
Figure 1, shows a machine in front elevation in which the invention is embodied.

In illustrating the invention I have shown the same in connection with parts of a machine substantially like that disclosed in U. S. Patent 944,354 granted to me Dec. 28th, 1909, wherein the cans or receptacles 6, are carried or conveyed over a table 7, and beneath a series of movable individual hoppers 8,—the cans and hoppers being moved beneath and past the measuring device to receive a measured charge of material, which latter may then be deposited in the can while the individual hopper and can are traveling away from the measuring device. The individual hopper and cans are preferably in continuous motion, and the empty cans are fed beneath, and after being filled, are removed from the hopper as fully explained in my said prior patent.

By reference to Fig. 1 of the drawing it will be noted that the base portion 9, of the machine carries a frame 10, on which a main storage hopper 11, is mounted. The lower end of this hopper has a hollow head or casting 12, and a horizontal plate or cut-off valve 13, is seated against the under side of said head or casting to control the discharge of material from said main hopper. This plate or cut-off valve 13, has an opening 14, between its opposite ends and also has imperforate portions or cut-off bars 15 and 27, at opposite sides of said opening.

In the present instance, one end of the cut-off valve is connected to a rock lever 16, which latter is provided with an arm 17, that carries a roller 18. The roller on the arm 17, travels in a groove 19, of a cam 20, which latter revolves with a horizontal shaft 21, so that during each revolution of the shaft the rock lever will be given one complete reciprocation and thereby move the cut-off valve a complete stroke in one direction and then return the same.

Beneath the cut-off valve I provide a measuring receptacle 22, which has a single outlet 23, at its lower end. Beneath the cut-off valve and above said outlet, the opposite walls of said receptacle are provided with circular bearing openings or perforations 24, and 25, respectively. By referring to Fig. 4, of the drawing it will be noted that these bearing openings have their axes in horizontal alinement, but that the opening 24, is of a greater diameter than the opening 25.

A shaft 26, extends from one side of the measuring receptacle through the larger bearing opening, then across the interior of said receptacle, and has its end projecting into the smaller bearing opening 25, in which latter it is free to turn. This shaft 26, carries a valve plate 28, which latter has a tubular eye 29, through which the shaft extends and said eye is provided with a perforation 30, that registers with a similar perforation 31, in the shaft so that a fastening such as a pin or bolt may be passed through the eye perforation and into the shaft perforation 31, and thereby rigidly secure the valve plate, tubular eye and shaft together. By reference to Fig. 5, it will be noted that the tubular eye 29, extends part of the way only across the valve plate thus leaving an upper edge 32, of the valve plate that projects beyond the inner end of the tubular eye, and by reference to Fig. 4, it will be seen that the valve plate 28, extends from one wall of the measuring receptacle across to the directly-opposite wall of said receptacle.

The shaft 26, also sustains a tubular sleeve 33, which latter is loose on the shaft so that movement of the shaft may take place independently of the sleeve or the sleeve may be moved independently of the shaft. This tubular sleeve 33, carries a valve plate 34, which also extends across the chamber of the measuring receptacle and the inner end of the sleeve 33, confronts the inner end of the tubular eye 29, while the valve plates 28 and 34, depend from said eye and sleeve. The outer end of the tubular sleeve extends through and has bearing in the opening or bearing perforation 24, and a collar 35, is provided on the outer end of the sleeve.

It will thus be seen that the two valve plates 28 and 34, are hung in the chamber of the measuring device directly beneath the cut-off valve 13, and that said valve plates are mounted so as to be capable of swinging laterally in the chamber. By reference to Fig. 3, of the drawings it will be seen that the valve plates 28 and 34, are therein positioned so that plate 28, has a depending position with its free edge over the single outlet 23, while the free edge of the valve plate 34, is swung up into the chamber and under the opening 14, in the cut-off valve 13,— the interior wall of the measuring receptacle being curved to conform to the path of the valve plate-edges so as to effect a comparatively tight joint therewith.

By this arrangement of valve plates I form two measuring compartments 36 and 37, in the measuring receptacle,—the former being controlled by the plate 28, and the latter by the valve plate 34.

In the position of the valves shown in Fig. 3 of the drawing the measuring compartment 37, has its upper end in communication with the main hopper through the opening 14, in the cut-off slide valve and its lower end is closed by the valve 34, whereas the compartment 36, is closed at the upper side by the cross-bar 15, of the cut-off slide valve but is open to discharge through opening 23, because valve plate 28, is down.

In the operation of the machines the valve plates 28 and 34, are alternately swung up and down, first to receive a charge and then to discharge the material.

The mechanism employed to effect these movements of the valve plates will therefore now be described.

In the present instance the outer end of the tubular sleeve 33, is provided with a collar-like head 38, which is rigid with the sleeve, and said head has an arm 39, that projects laterally therefrom and carries a roller 40, at its outer or free end. The shaft 26, which passes freely through the sleeve 33, and forms a pivotal support for the latter, has its outer end projecting outwardly and beyond the end of the sleeve, and the outer end of this shaft also carries a collar-like head 41, with an arm 42, that has a roller 43, at its outer or free end. The arm 39, carries a lug 44, while the arm 42, is provided with a lug 45, and a spring 46, is coiled about the shaft 26, between the heads 38, and 41, and one end of this spring has a hook 47, that engages the lug 44, while the other end of said spring is provided with a hook 48, that engages lug 45. The spring is therefore loosely coiled around shaft 26, but has one end attached to one lug and its other end attached to the other lug so that if one lug is held while the other lug is swung upward the tension on the spring will be increased.

A vertical shaft 49, has a gear 50, on its lower end which meshes with and is driven by a gear 51, on the horizontal shaft 21, and the upper end of this vertical shaft terminates beneath the projecting end of the shaft 26. By preference the upper end of shaft 49 is somewhat tapered to form a stop 50, against the opposite sides of which the lugs 44 and 45, may strike when one or the other of said lugs is in the down position, as shown in Fig. 4 of the drawing.

Shaft 49, carries a cam 52, at its upper end which latter has a horizontal upper ledge 53, that revolves in a horizontal plane, and also has downwardly-extending ends 54. In other words, the cam has a raised operating surface 53, that extends only part of the way therearound and this raised surface has position in a horizontal plane above the rollers 40 and 43, when the latter are in their lowered positions.

The cam has a hub portion 55, that fits down on the shaft and is longitudinally adjustable on the shaft by means of a spline and feather connection, shown at 56, in Fig. 4. The hub also has an annular groove 57, around its exterior and near the lower end thereof, for a purpose that will presently be explained.

A sleeve 58, also surrounds the shaft and has a screw-threaded exterior 59, and at its upper end this sleeve has a circular head or flange 60, with spaced-apart circumferential notches 61, therein. A recess is also provided in the upper side of the head 60, so that the lower end of the cam-hub 55, may seat therein and a plurality of plates 62, are secured on the upper surface of the head and have their inner ends projecting into the annular groove 57, of the cam-hub so as to hold the hub down, but permit it to revolve with respect to and on said head.

A bracket arm 63, extends horizontally from the frame and has a split clamping nut 64, at its outer end through which the threaded cam-hub 55, extends so that by clamping the split nut about the hub the latter may be held against vertical movement. In order to prevent the head and hub working around because of vibration of the machine, I provide a horizontal locking bar 65, whose end projects into one of the circumferential notches 61, in the head and thus locks said head against rotation, and in practice I also provide a stationary upright bar 66, with a scale thereon whereby the head and hub may be accurately positioned on the shaft 49, to hold the cam in a predetermined horizontal plane that will give a correct throw to the valve plates 28 and 34.

In the operation of the machine the material is placed in the main hopper 11, and the cans to be filled are fed to the table 7, as set forth in my said prior patent.

Cut-off valve 13, begins to reciprocate and allows the material to pass from the main hopper alternately into the compartments 36 and 37, of the measuring receptable.

When the opening 14, of the cut-off valve is in communication with a compartment, the valve plate, either 28 or 34, of that compartment is swung up during the filling of that compartment. The cut-off valve then moves horizontally over the other compartment and during this movement cuts off communication between the filled compartment and the main hopper,—in case of compartment 36, bar 15, will effect this cut-off and in the case of compartment 37, bar 27, will effect the cut-off. When the cut-off has been effected, the valve plate of the filled compartment will be swung down by means of the roller and arm which controls that plate, dropping from the end 54, of the cam 52,—it being understood that roller 40, controls sleeve 33, and valve plate 34, of compartment 37, while roller 43, rocks shaft 26, and valve plate 28, in compartment 36. Thus it will be understood that cam 52, is revolved continuously and by alternately operating the rollers 40 and 43, effect a swinging movement to the valve plates 34 and 28, one after the other, and that the timing of this operation is such with respect to the cut-off slide valve 13, that the cut-off between the main hopper and a compartment of the measuring receptacle will be effected when the valve plate of that compartment is about to be lowered to discharge the material into the traveling hopper 8, beneath.

Obviously, the further the valve plates are swung up into the compartments the smaller will the measuring space of those compartments become. Therefore by raising or lowering the cam 52, on the shaft 49, the upward throw of the valve plates will be increased or decreased and the quantity of material thus measured will be less or more as the case may be.

It will be noted that when a roller passes off the end of the cam 52, the coiled spring 46, will serve to draw the lug 44 or 45 of the arm which carries that lug down, and thereby aid in rotating the shaft on which that arm is carried and insure the downward swing of the valve plate. When a lug is down it will engage the side of the stop 50, on the upper end of the shaft so that when the other lug is swung up the coiled spring will be twisted about the shaft 26, and thereby have its tension increased.

When a valve plate is lowered it will allow the measured material to drop into a hopper 8, beneath, which latter will then feed it to the can under it.

Having described my invention what I claim is,—

1. In a can-filling machine, the combination with a hopper, of a measuring device having two compartments; valve means for providing communication between the hopper and alternately with said two compartments; means in each compartment for closing the same and means for adjusting said closing means to change the size of said compartments.

2. In a can-filling machine, the combination with a hopper, of a measuring device having two compartments; valve means for providing communication between the hopper and alternately with said two compartments; independent movable means for closing each compartment and means for simultaneously adjusting the throw of said movable closing means to change the capacity of both compartments.

3. In a can-filling machine, the combination with a hopper, of a measuring device beneath the hopper and provided with two compartments; a valve reciprocating between the hopper and said two compartments to alternately establish communication between the compartments and hopper and swinging means below the valve for alternately opening the compartments to discharge the material therefrom.

4. In a can-filling machine, the combination with a hopper, of a measuring device beneath the hopper and provided with two compartments; a valve reciprocating between the hopper and said two compartments to alternately establish communication between the compartments and hopper; a swinging plate in each compartment below the reciprocating valve and means for alternately swinging said plates to effect a discharge from one compartment at a time.

5. In a can-filling machine, the combination with a hopper, of a measuring device beneath the hopper and provided with two compartments; a valve reciprocating between the hopper and said two compartments to alternately establish communication between the compartments and hopper; plates pivotally mounted beneath the reciprocating valve; means for swinging said plates to alternately open and close said compartments and means for adjusting the throw of the plates to change the size of the compartments.

6. In a can-filling machine, the combination with a hopper, of a measuring device beneath the hopper; a slide valve between the measuring device and hopper; two plates pivotally mounted in the measuring device beneath the slide valve and means for swinging the plates in opposite directions to form two compartments in the measuring device.

7. In a can-filling machine, the combination with a hopper, of a measuring receptacle beneath the hopper; a valve interposed between the hopper and measuring receptacle; two oscillating devices in the measuring receptacle beneath the valve; a plate carried by one of said oscillating devices, another plate carried by the other of said oscillating devices and both plates being movable with their oscillating devices and means for intermittently oscillating said devices.

8. In a can-filling machine, the combination with a hopper, of a measuring receptacle beneath the hopper and having a single outlet; a valve interposed between the hopper and measuring receptacle; two plates mounted in the measuring receptacle and having an edge that may swing toward and from the single outlet of said receptacle and means for swinging said plates in opposite directions.

9. In a can-filling machine, the combination with a hopper, of a measuring receptacle beneath the hopper and having a single outlet; a valve interposed between the hopper and measuring receptacle; a shaft extending across the measuring receptacle beneath the valve, said shaft carrying a plate that extends toward one wall of the measuring receptacle; another plate pivotally mounted in said receptacle and having an edge that may be swung into close proximity to another wall of said receptacle and means on the exterior of the receptacle for swinging the plates in opposite directions.

10. In a can-filling machine, the combination with a hopper, of a measuring receptacle beneath the hopper and having a single outlet; a valve interposed between the hopper and measuring receptacle; a shaft extending across the measuring receptacle beneath the valve, said shaft carrying a plate that extends toward one wall of the measuring receptacle; a sleeve loosely mounted on the shaft in said receptacle and carrying another plate,—said shaft and sleeve extending to the exterior of said receptacle; means on the exterior of the receptacle for rocking said shaft and sleeve and means for actuating the valve.

11. In a can-filling machine, the combination with a hopper, of a measuring receptacle beneath the hopper; a valve between the hopper and measuring receptacle; two plates mounted to swing in the measuring receptacle; oscillating means extending from the exterior into the receptacle and connected with the plates; means on the exterior of the receptacle for oscillating said means and means for varying said latter means to change the throw of the plates in the receptacle.

12. In a can-filling machine, the combination with a hopper, of a measuring receptacle beneath the hopper; a valve between the hopper and measuring receptacle; two plates mounted to swing in the measuring receptacle; oscillating means extending from the exterior into the receptacle and connected with the plates; a cam on the exterior of the receptacle for actuating the oscillating means and means for adjusting the cam to vary the throw of the oscillating means and the plates in the receptacle.

13. In a can-filling machine, the combination with a hopper, of a measuring receptacle beneath the hopper and having a single outlet; a valve interposed between the hopper and measuring receptacle; a shaft extending from the exterior into the measuring receptacle; a plate in the receptacle and carried by the shaft; a sleeve loosely mounted on the shaft and also projecting from the exterior into the interior of said receptacle; a plate in the receptacle and carried by said sleeve; a rock-arm on the exterior portion of the shaft; a rock-arm on the exterior portion of the sleeve and cam-means for operating said rock arms.

14. In a can-filling machine, the combination with a hopper, of a measuring receptacle beneath the hopper and having a single outlet; a valve interposed between the hopper and measuring receptacle; two plates in the measuring receptacle; means for pivotally sustaining said plates; rock-arms for actuating the pivotally-sustaining means and a cam for operating the rock arms.

15. In a can-filling machine, the combination with a hopper, of a measuring receptacle beneath the hopper and having a single outlet; a valve interposed between the hopper and measuring receptacle; two plates in the measuring receptacle; separate pivot means for carrying each plate; a rock-arm for each separate pivot means; yielding means for engaging the rock-arms and a cam for operating the rock arms and placing the yielding means under tension.

16. In a can-filling machine, the combination with a hopper, of a measuring receptacle beneath the hopper and having a single outlet; a valve interposed between the hopper and measuring receptacle; two plates in the measuring receptacle; separate means for pivotally sustaining the two plates; a rock arm for each pivot means; yielding means connecting the rock arms; a cam for alternately operating the rock arms and stop means to limit the movement of the rock arms in one direction.

In testimony whereof I affix my signature in the presence of two witnesses.

CHARLES H. AYARS.

Witnesses:
O. W. ACTON,
MARY D. BANKS.

Copies of this patent may be obtained for five cents each, by addressing the "Commissioner of Patents, Washington, D. C."